(12) United States Patent
Jung et al.

(10) Patent No.: US 11,056,950 B2
(45) Date of Patent: Jul. 6, 2021

(54) MOTOR

(71) Applicant: LG ELECTRONICS INC., Seoul (KR)

(72) Inventors: Taeyong Jung, Seoul (KR); Youngil Park, Seoul (KR); Haerim Yang, Seoul (KR); Hyeonho Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/512,471

(22) Filed: Jul. 16, 2019

(65) Prior Publication Data
US 2020/0328657 A1    Oct. 15, 2020

(30) Foreign Application Priority Data
Apr. 12, 2019 (KR) .................. 10-2019-0042924

(51) Int. Cl.
*H02K 9/19* (2006.01)
*H02K 1/32* (2006.01)
*H02K 11/21* (2016.01)
*H02K 7/00* (2006.01)

(52) U.S. Cl.
CPC ............... *H02K 9/19* (2013.01); *H02K 1/32* (2013.01); *H02K 7/003* (2013.01); *H02K 11/21* (2016.01)

(58) Field of Classification Search
CPC . H02K 9/19; H02K 11/21; H02K 1/32; H02K 7/003; H02K 9/00; H02K 9/005; H02K 9/02; H02K 9/04; H02K 9/06; H02K 9/08; H02K 9/10; H02K 9/12; H02K 9/14; H02K 9/16; H02K 9/18; H02K 9/193; H02K 9/197; H02K 9/20; H02K 9/22; H02K 9/24; H02K 9/26; H02K 9/28; H02K 5/12; H02K 5/20; H02K 2209/00; H02K 1/2766; H02K 2213/03
USPC ..... 310/52, 54, 55, 56, 57, 58, 59, 60 R, 61, 310/60 A, 62, 63
See application file for complete search history.

(56) References Cited

U.S. PATENT DOCUMENTS

| | | | | |
|---|---|---|---|---|
| 4,902,922 A | * | 2/1990 | Annovazzi | H02K 1/243 310/263 |
| 2007/0194638 A1 | * | 8/2007 | Birdi | H02K 1/32 310/54 |
| 2013/0334926 A1 | * | 12/2013 | Taguchi | H02K 15/028 310/216.134 |

(Continued)

FOREIGN PATENT DOCUMENTS

| KR | 10-1238209 | 3/2013 |
|---|---|---|
| KR | 10-1340403 | 12/2013 |

*Primary Examiner* — Quyen P Leung
*Assistant Examiner* — Alexander A Singh
(74) *Attorney, Agent, or Firm* — Finnegan, Henderson, Farabow, Garrett & Dunner, LLP (57) ABSTRACT

A motor includes a rotary shaft having at least one spray hole for spraying a cooling fluid, a rotor installed on the rotary shaft, and a stator surrounding an outer circumference of the rotor, wherein the rotor includes a plurality of rotor blocks arranged on an outer circumference of the rotary shaft. Each of the rotor blocks may include a magnet installed at a rotor core and a cooling guide may be disposed between a pair of the plurality of rotor blocks and form a spray flow path for guiding a cooling fluid that has passed through the spray hole to be sprayed in a direction toward an inner circumference of the stator.

19 Claims, 6 Drawing Sheets

(56) References Cited

U.S. PATENT DOCUMENTS

| | | | |
|---|---|---|---|
| 2014/0042841 A1* | 2/2014 | Rippel | H02K 1/20 |
| | | | 310/54 |
| 2014/0265658 A1* | 9/2014 | Sten | H02K 9/19 |
| | | | 310/54 |
| 2017/0012500 A1* | 1/2017 | Brauer | H02K 9/193 |
| 2017/0310179 A1* | 10/2017 | Okouchi | H02K 1/276 |
| 2019/0267859 A1* | 8/2019 | Kitahara | H02K 1/276 |

* cited by examiner

MOTOR

CROSS-REFERENCE TO RELATED APPLICATIONS

This application claims the benefit of the Korean Patent Application No. 10-2019-0042924 filed on Apr. 12, 2019, which is hereby incorporated by reference herein in its entirety.

BACKGROUND

Field of the Invention

The present invention relates to a motor, and more particularly, to a motor capable of cooling a stator by a cooling fluid such as oil or the like.

Discussion of the Related Art

Generally, a motor (or an electric motor) is a device that converts electric energy into mechanical energy using a force applied to a conductor in which a current flows in a magnetic field.

Recently, in order to prevent environmental pollution due to harmful gases generated in the combustion of fuel of a vehicle, a motor is increasingly used as a driving source of the vehicle.

When the motor is driven, high temperature heat is generated, and efficient heat dissipation of the motor may be an important factor that determines performance of the motor.

The motor may be cooled by air-cooling using air and water-cooling using cooling water.

In the water-cooled motor, a water jacket through which cooling water passes may be disposed between a motor housing and a stator or a cooling water flow path through which cooling water passes may be formed in the motor housing itself, and cooling water supplied from the outside of the motor may cool the housing and the stator, while passing through the water jacket or the cooling water flow path.

Such a motor in which the water jacket is disposed or the cooling water flow path is formed is based on an indirect cooling scheme in which heat inside the motor is absorbed by cooling water through the water jacket or the motor housing, and such an indirect cooling scheme has low cooling efficiency.

Meanwhile, when the motor includes the water jacket, an assembling process for mounting the water jacket is complicated. Also, when the cooling water flow path is formed in the motor housing, a housing structure is complicated in shape and structure, which increases manufacturing cost of the motor housing. Further, when the motor is cooled by the water-cooling method as described above, a total volume of the motor is increased by a volume occupied by the water jacket or the cooling water flow path, and thus, the motor is not compact.

Meanwhile, a cooling fluid such as oil or a compressible refrigerant may directly cool the inside of the motor.

One example of such a motor may be configured such that a cooling fluid is directly sprayed to the motor. Korean Patent Registration No. KR 10-1238209 B1 (published on Mar. 4, 2013) discloses a spray tube spraying a compressible refrigerant used in a vapor compression refrigerating cycle directly into the motor to cool the motor.

A motor disclosed in Korean Patent Registration No. KR 10-123820 B1 includes an inlet and an outlet for introducing and discharging compressible refrigerant into a cover, respectively, and spray tube accommodating parts each accommodating a refrigerant spray tube in a frame and a stator, respectively, and a spray hole provided on the refrigerant spray tube for spraying a compressible refrigerant and spraying the compressible refrigerant toward an end portion of a stator coil.

However, in the motor using the compressible refrigerant as described above, a flow path pressure is increased due to evaporation of the compressible refrigerant, lowering cooling efficiency, the compressible refrigerant must be filled frequently when the compressible refrigerant leaks, and maintenance expenses increase.

Meanwhile, oil may be used as a cooling fluid for cooling the inside of the motor. An example of such a motor is disclosed in Korean Patent Registration No. KR 10-1340403 B1 (published on Dec. 11, 2013).

The motor disclosed in Korean Patent Publication No. KR 10-1340403 B1 includes a rotor shaft side refrigerant flow path including an inlet exposed to the outside of an outer housing and allowing a refrigerant fluid to flow therethrough from the outside of a rotor shaft and an outlet communicating with an annular space between the rotor shaft and a rotor and allowing the refrigerant fluid introduced from the inlet to flow out therethrough to the annular space, and provided inside the rotor shaft; and a rotor side refrigerant flow path including an introduction port communicating with the annular space and a discharge port disposed outside the housing and discharging the refrigerant fluid received from the introduction port to a gap between the housing and the outer housing, and formed inside the rotor, wherein the stator is cooled by dropping from a stator oil introduction flow path of a cylindrical portion of an inner housing to a coil end portion.

However, in the motor disclosed in Korean Patent Registration No. 10-1340403 B1, the coil end portion and a magnet may be cooled, whereas an inner coil accommodated in a stator core of the coil is not directly cooled by the refrigerant fluid, and the entire coil including the coil end portion and the inner coil may not be evenly cooled.

SUMMARY

An aspect of the present invention is directed to providing a motor in which a coil is rapidly cooled by centrifugally spraying a cooling fluid into the coil.

Another aspect of the present invention is directed to providing a motor in which a spray flow path having a simple structure is provided in a rotor without having to form a separate spray flow path on a rotor core itself.

To achieve these and other advantages and in accordance with the purpose of the disclosure, as embodied and broadly described herein, there is provided a motor including a rotary shaft and a rotor and a stator, wherein the rotary shaft includes a spray hole for spraying a cooling fluid and the rotor includes a spray flow path guiding the cooling fluid passing through the spray hole to an inner circumference of the stator.

During rotation of the rotary shaft, the cooling fluid may be centrifugally sprayed toward an inner circumference of the stator after sequentially passing through the rotary shaft and the rotor, and the coil constituting the stator may be rapidly cooled by the cooling fluid sprayed in a centrifugal direction from the rotor.

At least one spray hole may be formed on the rotary shaft.

In a state in which the rotor is mounted on the rotary shaft, the rotor may be rotated together with the rotary shaft so that the cooling fluid may be centrifugally sprayed toward the inner circumference of the stator.

The stator may be disposed to surround the outer circumference of the rotor, and the cooling fluid sprayed outwardly from the rotor may cool the stator core and the coil at the inner circumference of the stator.

The rotor may include a plurality of rotor blocks and at least one cooling guide.

Each of the plurality of rotor blocks may have a magnet in the rotor core. Each of the plurality of rotor blocks may be disposed on an outer circumference of the rotary shaft.

The at least one cooling guide may be disposed between the plurality of rotor blocks. The at least one cooling guide may form a spray flow path for guiding the cooling fluid which has passed through the spray hole so as to be sprayed to the inner circumference of the stator.

The spray flow path may not be directly formed in each of the plurality of rotor blocks but may be positioned between the plurality of rotor blocks by the cooling guide.

In this case, it is not necessary to form a separate opening for forming a spray flow path in the rotor core of each of the plurality of rotor blocks, and the motor may form the spray flow path with a simple structure.

The stator may include a stator core including a slot, and a coil wound around the slot.

An outlet of the spray flow path may be opened toward the inner circumference of the stator core.

The coil may include an inner coil accommodated in the slot and a pair of end coils extending from the inner coil, and the cooling fluid escaping from the outlet of the spray flow path may be sprayed toward the inner circumference of the stator core and the inner coil.

That is, the inner coil accommodated in the slot may be cooled more quickly, and the coil as a whole may be quickly cooled in the motor, as compared with a case where end coils are mainly cooled and the inner coil is not cooled.

The inlet of the spray flow path may be matched to the spray hole in a radial direction.

A first fixing portion may protrude from the inner circumference of the cooling guide and the rotary shaft may have a second fixing portion fixed to the first fixing portion when the inlet of the spray flow path is matched to the spray hole.

When the first fixing portion is fixed to the second fixing portion, the first fixing portion may be restricted to the second fixing portion in a rotation direction, and the cooling guide may not be rotated arbitrarily.

That is, the cooling fluid may be reliably sprayed to the inner circumference of the stator in a state in which the spray flow path and the spray hole are matched to each other in the radial direction.

A plurality of spray holes may be formed on the rotary shaft at positions different from each other in an axial direction. In this case, the plurality of spray holes may spray the cooling fluid three-dimensionally and the inner coil may be cooled more quickly.

The motor may further include a sensor sensing the rotary shaft. Any one of the plurality of spray holes may be closer to the sensor than the other.

The rotary shaft may include a first region surrounded by the rotor, and a second region not surrounded by the rotor and facing the end coil of the coil.

The plurality of spray holes may be formed in the first region.

The plurality of rotor blocks may be spaced apart from each other in the axial direction.

The cooling guide may be disposed between a pair of adjacent rotor blocks in the axial direction. The cooling guide may be fixed by a pair of adjacent rotor blocks, and certain movement thereof in the axial direction thereof may be restricted.

A thickness of the cooling guide may be thinner than a thickness of the rotor core. In this case, deterioration of the electromagnetic performance by the cooling guide may be minimized, the axial length of the rotor may not be excessively increased, and the motor may become as compact as possible in the axial direction.

An inner diameter of the cooling guide may be equal to an inner diameter of the rotor block. The cooling fluid having passed through the spray hole may be quickly guided to the spray flow path.

An outer diameter of the cooling guide may be smaller than or equal to an outer diameter of the rotor core. A gap between the stator and the rotor may need not be increased more than necessary, and the motor may become compact.

The rotor core may be a conductor, and the cooling guide may be a non-conductor.

If the cooling guide is a conductor, eddy current loss may occur, and thus, the cooling guide is preferably a non-conductor.

Since the cooling guide may dissipate heat generated from the rotor core and the magnet, the cooling guide may be formed of a material having high thermal conductivity.

Since the cooling guide is rotated together with the rotary shaft, the cooling guide may be formed of a material having high yield stress less deformed by a centrifugal force.

The cooling guide may be aluminum or a synthetic resin.

One end and the other end of the cooling guide may be spaced apart from each other in a circumferential direction, and a slit forming the spray flow path may be provided between one end and the other end of the cooling guide.

The cooling guide may have an arc shape as a whole. In particular, the cooling guide may have a major arc shape.

The slit may be radially open in the cooling guide. In this case, the cooling fluid sprayed from the rotary shaft may be sprayed more quickly to the inner circumference of the stator, while passing through the slit.

A plurality of cooling guides may be arranged on the outer circumference of the rotary shaft. The plurality of cooling guides may be axially spaced apart on the rotary shaft. An opening direction of the slit formed on any one of the plurality of cooling guides may be different from an opening direction of the slit formed on the other of the plurality of cooling guides.

In this case, the cooling fluid may be sprayed as evenly as possible over the entire inner circumference of the stator, without being concentrated on one side of the inner circumference of the stator.

The cooling guide may include a first protrusion protruding radially from an outer circumference of one end of the cooling guide and a second protrusion protruding radially from an outer circumference of the other end of the cooling guide. The first protrusion and the second protrusion may be spaced apart from each other in the circumferential direction. Each of the first protrusion and the second protrusion may face the inner circumference of the stator.

The first protrusion and the second protrusion may ensure linearity of the cooling fluid passing through the spray flow path, and the cooling fluid may sufficiently reach the inner circumference of the stator through an air gap between the stator and the rotor.

The rotary shaft may include an end coil cooling hole opened in the radial direction in the second region. This end coil cooling hole may allow the cooling fluid to be sprayed to the end coil, the inner coil of the coil may be cooled by the spray hole and the spray flow path, and the end coil may be cooled by the end coil cooling hole. That is, the inner coil and the end coil may be separately cooled, and the coil may be evenly and quickly cooled as a whole.

The end coil cooling hole may be provided as a pair.

A first distance over which the pair of end coil cooling holes are axially spaced apart from each other may be longer than a second distance over which the plurality of spray holes are axially spaced apart from each other.

The rotor may include a pair of end plates covering the outermost rotor block.

A stopper may be provided on the outer circumference of the rotary shaft so that any one of the pair of end plates may be axially caught by the stopper.

A retainer may be disposed on the outer circumference of the rotary shaft so that the other of the pair of end plates is axially caught by the retainer.

The stopper and the retainer may fix an axial position of the rotor, and the spray flow path does not deviate from the spray hole and guide spray of the cooling fluid to an inner circumference of the stator with high reliability.

According to an embodiment of the present invention, since the spray hole spraying the cooling fluid to the rotary shaft is provided and the spray flow path guiding the cooling fluid passing through the spray hole to the inner circumference of the rotor is provided in the rotor, whereby the coil configuring the stator may be quickly cooled by the cooling fluid sprayed in a centrifugal direction from the rotor.

Further, since the spray flow path is not formed directly on each of the plurality of rotor blocks but is positioned between the plurality of rotor blocks by the cooling guide, there is no need to form a separate opening for forming a spray flow path in the rotor core of each of the plurality of rotor blocks, and the motor may quickly cool the stator with a simple structure.

Further, the cooling fluid escaping from the outlet of the spray flow path may be sprayed toward the inner circumference of the stator core and the inner coil of the rotor, and thus, the inner coil in which the cooling fluid is accommodated in the slot may be quickly cooled.

Further, in the motor, the entire coil may be quickly cooled, as compared with a case where the end coil is mainly cooled and the inner coil is not cooled.

When the first fixing portion is fixed to the second fixing portion, arbitrary rotation of the cooling guide is restricted, and in a state in which the spray flow path and the spray hole are radially matched with each other, the cooling fluid may be reliably supplied to the inner circumference of the stator.

Further, a plurality of spray holes formed at different positions in the axial direction may spray the cooling fluid three-dimensionally, and the inner coil may be cooled more quickly.

Further, the cooling guide may be disposed between a pair of axially adjacent rotor blocks and may be reliably fixed by a pair of adjacent rotor blocks.

Further, the cooling guide is thinner than the rotor core, and thus, deterioration of electromagnetic performance by the cooling guide may be minimized and the motor may become compact as much as possible in the axial direction.

Further, since the outer diameter of the cooling guide is smaller than or equal to the outer diameter of the rotor core, a gap between the stator and the rotor may not need to be increased more than necessary for the cooling guide, and the motor may become compact.

Further, since the rotor core is a conductor and the cooling guide is a non-conductor, eddy current loss that may occur when the cooling guide is a conductor may be minimized.

The cooling guide is formed of aluminum to advantageously dissipate heat generated from the rotor core and the magnet and deformation of the cooling guide due to a centrifugal force may be minimized.

The spray flow path may be formed by the slit formed in the cooling guide, and the spray flow path may be formed with a simple structure of the cooling guide.

Further, since the slit is open radially in the cooling guide, the cooling fluid sprayed from the rotary shaft may be rapidly sprayed to the inner circumference of the stator after passing through the slit.

Further, since the opening directions of the slits of the plurality of cooling guides are different from each other, the cooling fluid may be sprayed as evenly as possible over the entire inner circumference of the stator without being concentrated on one side of the inner circumference of the stator.

The first protrusion and the second protrusion may ensure linearity of the cooling fluid passing through the spray flow path, and the cooling fluid may reach as close as possible the inner circumference of the stator through the air gap between the stator and the rotor.

Further, the end coil cooling hole formed on the rotary shaft may allow the cooling fluid to be sprayed to the end coil, and thus, the entire coil may be cooled evenly and quickly.

Further, the stopper and the retainer may fix the axial position of the rotor, and the spray flow path may not deviate from the spray hole and guide and spry the cooling fluid to the inner circumference of the stator with high reliability, without deviating from the spray hole.

BRIEF DESCRIPTION OF THE DRAWINGS

The accompanying drawings, which are included to provide a further understanding of the disclosure and are incorporated in and constitute a portion of this application, illustrate embodiments of the disclosure and together with the description serve to explain the principle of the disclosure. In the drawings.

DETAILED DESCRIPTION OF THE DISCLOSURE

Reference will now be made in detail to the exemplary embodiments of the present invention, examples of which are illustrated in the accompanying drawings. Wherever possible, the same reference numbers will be used throughout the drawings to refer to the same or like parts.

Hereinafter, specific embodiments of the present invention will be described in detail with reference to the drawings.

Figure 1:
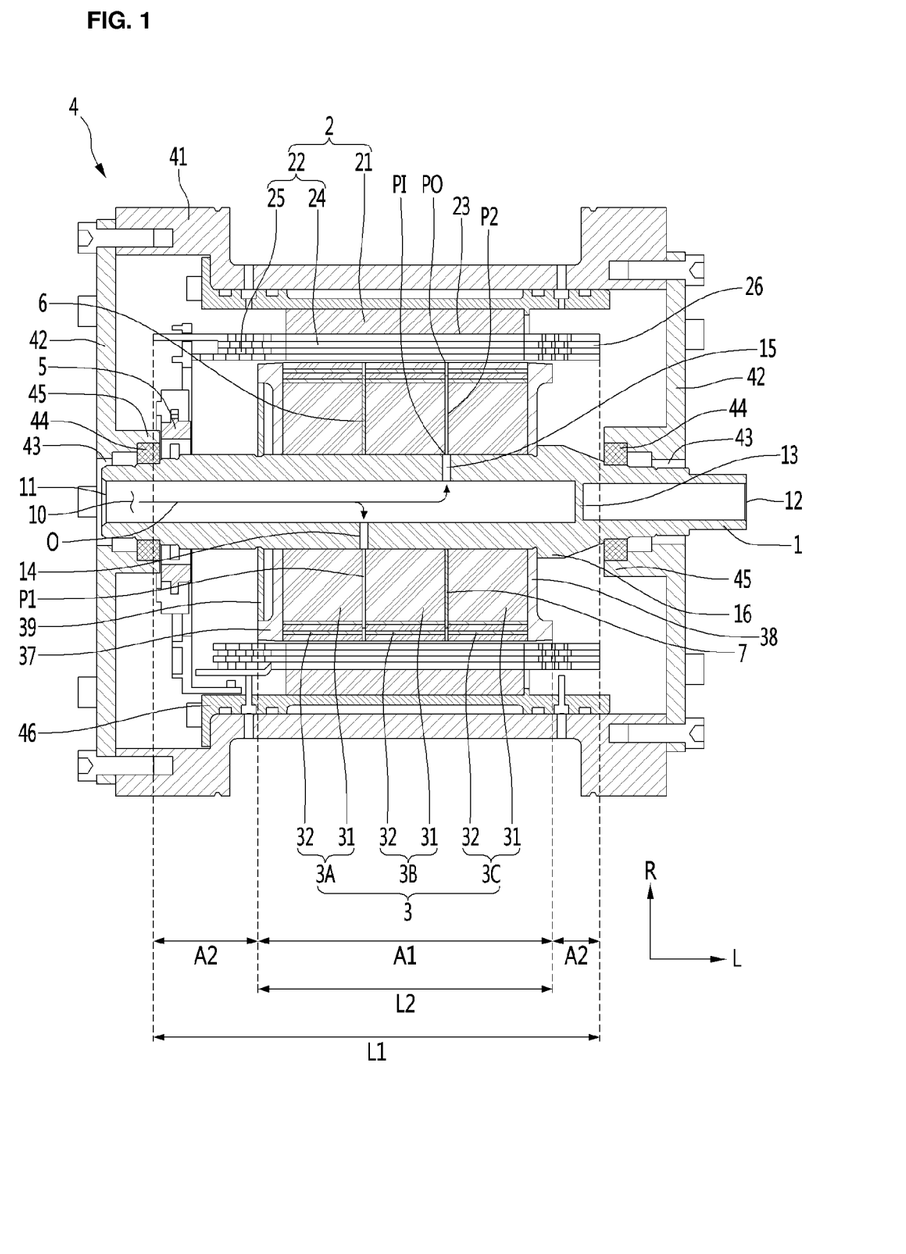
FIG. 1 is a cross-sectional view of a motor according to an embodiment of the present invention.
Figure 2:
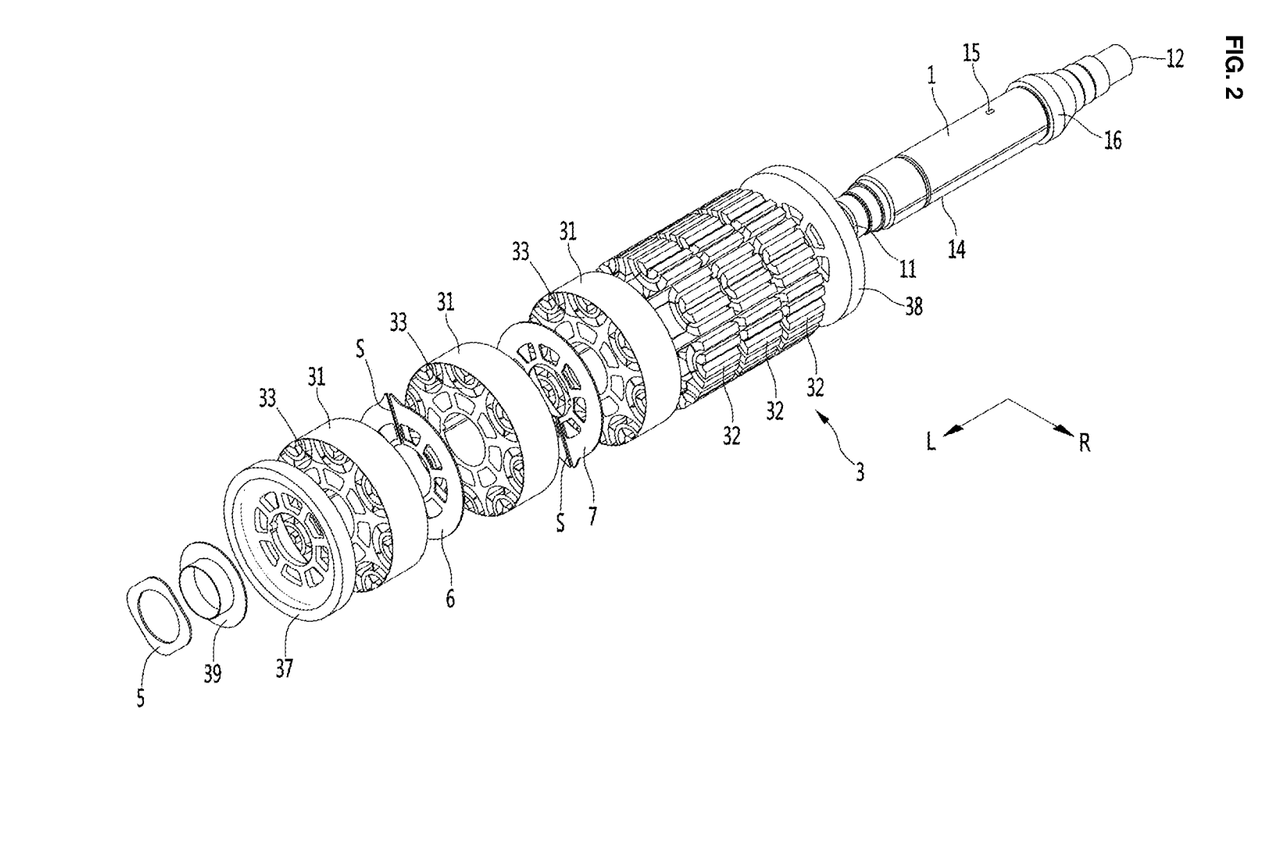
FIG. 2 is an exploded perspective view of a rotor and a rotary shaft according to an embodiment of the present invention.

FIG. 1 is a cross-sectional view of a motor according to an embodiment of the present invention, and FIG. 2 is an exploded perspective view of a rotor and a rotary shaft according to an embodiment of the present invention.

The motor includes a rotary shaft 1, a stator 2, and a rotor 3.

The rotary shaft 1 may be rotatably supported by a housing 4.

The stator 2 may be positioned between the rotor 3 and the housing 1 in a radial direction. The stator 2 may be disposed on an inner circumference of the housing 4. The stator 2 may surround an outer circumference of the rotor 3.

A coil 22 may be wound around a stator core 21 of the stator 2.

The stator core 21 may be a rotor steel plate. The stator core 21 may be disposed on an inner circumference of a stator mounter 46.

The stator core 21 may be positioned outside the rotor 3. The stator core 21 may have a hollow cylindrical shape, and an inner circumference thereof may face the outer circumference of the rotor 3.

The stator core 21 may have a slot 23 in which the coil 22 is wound. The slot 23 may be formed on the inner circumference of the stator core 21. The slot 23 may be provided in plurality along the inner circumference of the stator core 21 and the plurality of slots 23 may be distinguished by teeth projecting from the inner circumference of the stator core 21.

An insulator may be disposed in the slot 23 of the stator core 21. The insulator may be positioned between the stator core 21 and the coil 22.

A portion of the coil 22 may be partly accommodated in the slot 23 and the remainder may be positioned outside the slot 23.

The coil 22 may be divided into an inner coil 24 and a pair of end coils 25 and 26.

The inner coil 24 and the pair of end coils 25 and 26 are classified according to whether they are accommodated in the slot 23.

The inner coil 24 may be a coil portion accommodated in the slot 23 of the coil 22.

The pair of end coils 25 and 26 may be a coil portion extending to the outside of the slot 23 from the inner coil 24 and positioned outside the slot 23.

The inner coil 24 and the pair of end coils 25 and 26 may be integrally formed.

A total length of the coil 22 in an axial direction L may be defined by the sum of an axial length of each of the pair of end coils 25 and 26 and an axial length of the inner coil 24. The axial total length L1 of the coil 22 may be longer than an axial length of the stator core 21 in the axial direction L and may be longer than a total length L2 of the rotor 3 in the axial direction L.

The inner coils 24 may face the outer circumference of the rotor 3 in the radial direction R and each of the pair of end coils 24 may face the outer circumference of the rotary shaft 1, rather than facing the outer circumference of the rotor 3 in the radial direction R.

The rotor 3 may be positioned between the rotary shaft 1 and the stator 2 in the radial direction R and a gap may be formed between the rotor 3 and the stator 2.

A magnet 32 may be mounted in a rotor core 31 of the rotor 31.

The rotor core 31 may have a substantially hollow cylindrical shape.

An outer diameter of the rotor core 31 may be smaller than an inner diameter of the stator core 21 and an air gap may be formed between the outer circumference of the rotor core 31 and the inner circumference of the stator core 21.

The rotor core 31 may have a magnet insertion hole 33 opened in the axial direction and the magnet 32 may be inserted into the magnet insertion hole 33 in the axial direction so as to be accommodated in the magnet insertion hole 33.

A space for accommodating the rotary shaft 1, the stator 2, and the rotor 3 may be provided inside the housing 4. The housing 4 may form an appearance of the motor.

The housing 4 may be configured as a combination of a plurality of members. The housing 4 may include a hollow body 41 surrounding the outer circumference of the stator 21 and a pair of covers 42 disposed at the ends of the hollow body 41.

Each of the pair of covers 42 may have a through hole 43 through which the rotary shaft 1 passes and a bearing housing 45 supporting the bearing 44 supporting the rotary shaft 1.

The housing 4 may further include the stator mounter 46 to which the stator core 21 is fixed. The stator mounter 46 may be fastened to the inner circumference of the hollow body 41 by a fastening member such as a screw.

The motor may be configured to directly cool the coil 22 by centrifugally spraying a cooling fluid O toward the stator core 21 and the inner coil 24.

The present embodiment may be a direct cooling type motor that centrifugally sprays the cooling fluid toward the inner coil 24 accommodated in the slot 23 of the stator core 21 of the coil 22.

To this end, a cooling flow path for centrifugally spraying the cooling fluid O into the stator core 21 and the inner coil 24 during rotation of the rotary shaft 1 may be provided in the rotary shaft 1 and the rotor 3.

The rotary shaft 1 may have at least one spray hole for spraying a cooling fluid. The rotary shaft 1 may have a rotary shaft flow path 10 for guiding the cooling fluid to the spray hole.

One example of the cooling fluid O may be oil, and when the motor is installed in the vehicle, the oil may be oil used to lubricate a transmission installed together with the motor in the vehicle. Such oil may flow into the rotary shaft oil flow path 10 formed in the rotary shaft 1 of the motor before or after passing through the transmission.

Meanwhile, the cooling fluid O may be configured as a refrigerant of an antifreeze or a refrigerating cycle and is not limited to oil.

The cooling fluid O flowing into the rotary shaft flow path 10 may sequentially pass through the spray hole and the rotor 3 formed in the rotary shaft 1 and is sprayed toward the stator 2.

The rotary shaft flow path 10 may extend in the axial direction L, i.e., in a longitudinal direction of the rotary shaft 1, inside the rotary shaft 1. The rotary shaft flow path 10 may be formed to have a predetermined length from one end 11 of the rotary shaft 1.

A barrier 12 preventing the cooling fluid O, which flows into the rotary shaft flow path 10 through one end 11 of the rotary shaft 1, from flowing into the other end 12 of the rotary shaft 1 may be formed inside the rotary shaft 1.

The rotary shaft flow path 10 may be defined as an opening formed in the axial direction between one end 11 of the rotary shaft 1 and the barrier 13. The barrier 12 may be positioned closer to the other end 12 of the rotary shaft 1, among the one end 11 and the other end 12 of the rotary shaft 1.

The rotary shaft 1 may include a first region A1 surrounded by the rotor 3 and a second region A2 not surrounded by the rotor 3 and facing the end coils 25 and 26 of the coil 22.

The spray hole may be formed to open in the radial direction R between one end 11 and the other end 12 of the rotary shaft 1.

The spray hole may be formed in a first region A1.

A single spray hole or a plurality of spray holes may be provided in the rotary shaft 1.

When one spray hole is provided in the rotary shaft 1, the spray hole may approximately be provided at center of a region of the rotary shaft 1 facing the rotor.

The plurality of spray holes 14 and 15 may be formed at different positions in the axial direction L. A first spray hole 14 among the plurality of spray holes 14 and 15 may be positioned closer to one end 11 of the rotary shaft 1 than the other spray hole. The second spray hole 15 among the plurality of spray holes 14 and 15 may be positioned closer to the other end 12 of the rotary shaft 1 than the other spray hole.

The motor may further include a sensor 5 for sensing the rotary shaft 1 in the vicinity of the rotary shaft 1. The sensor 5 may be spaced apart from the rotor 2 in the axial direction L. The sensor 5 may sense a rotation speed of the rotary shaft 1.

Any one of the first spray hole 14 and the second spray hole 15 may be closer to the sensor 5 than the other.

When three spray holes are formed in the rotary shaft 1, the three spray holes may include the first spray hole 14 closer to the sensor 5 than the other spray holes and the second spray hole 15 farthest from the sensor 5, among the three spray holes, and further include a third spray hole (not shown) farther from the sensor 5 than the first spray hole and closer to the sensor 5 than the second spray hole.

A stopper 16 for restricting sliding of the rotor 3 in the axial direction L may protrude from the outer circumference of the rotary shaft 1. The stopper 16 may be formed closer to the other end 12, among the one end 11 and the other end 12 of the rotary shaft 1.

The rotor 3 may be mounted on the rotary shaft 1.

The rotor 3 may include a plurality of rotor blocks 3A, 3B, and 3C and at least one cooling guide.

In each of the plurality of rotor blocks 3A, 3B, and 3C, a magnet 32 may be installed on the rotor core 31.

Each of the plurality of rotor blocks 3A, 3B, 3C may be disposed on the outer circumference of the rotary shaft 1. Each of the plurality of rotor blocks 3A, 3B, and 3C may be spaced apart from the adjacent rotor block in the axial direction L.

At least one cooling guide may be disposed between the plurality of rotor blocks 3A, 3B, and 3C to guide the cooling fluid O which has passed through the spray holes 14 and 15 to the inner circumference of the stator 2.

The cooling guide may be disposed between a pair of axially adjacent rotor blocks.

The cooling guides 6 and 7 may be arranged on the outer circumference of the rotary shaft 1 in plurality. The number of cooling guides may be one less than the number of the rotor blocks. For example, when the rotor 3 includes three rotor blocks 3A, 3B, and 3C, the rotor 3 may include two cooling guides 6 and 7.

The cooling guides 6 and 7 form spray flow paths P1 and P2 for guiding the cooling fluid O passing through the spray holes 14 and 15 to the inner circumference of the stator 2.

When the rotor 3 includes a plurality of cooling guides 6 and 7, the plurality of cooling guides 6 and 7 may be spaced apart from each other in the axial direction L on the outer circumference of the rotary shaft 1, and the rotor 3 may spray the cooling fluid three-dimensionally toward the inner circumference of the stator 2.

An inlet PI of the spray flow paths P1 and P2 may be matched to the spray holes 14 and 15 in the radial direction R. An outlet PO of the spray flow paths P1 and P2 may face the inner circumference of the stator 2. The spray flow paths P1 and P2 may be linear from the inlet PI to the outlet PO.

The rotor core 31 may be a conductor, and the cooling guides 6 and 7 may be non-conductors.

If the cooling guides 6 and 7 are conductors, eddy current loss may occur in the cooling guides 6 and 7, and thus, the cooling guides 6 and 7 may be provided as non-conductors.

If the cooling guides 6 and 7 are formed of a material having high thermal conductivity, the cooling guides 6 and 7 may absorb heat of the rotor core 31 and the magnet 32 and dissipate heat generated in the rotor core 31 and the magnet 32. The cooling guides 6 and 7 are preferably formed of a material having high thermal conductivity.

The cooling guides 6 and 7 may be rotated together with the rotary shaft 1 when the rotary shaft 1 rotates, and may be formed of a material having high yield stress less deformed by a centrifugal force.

The cooling guides 6 and 7 may have high thermal conductivity, may have high yield stress, may be non-conductors, and may be aluminum or a synthetic resin. When the cooling guides are formed of aluminum, the cooling guides 6 and 7 may be formed of pure aluminum or an aluminum alloy.

The rotor 3 may include a pair of end plates 37 and 38 covering the outermost rotor blocks 3A and 3C.

In the rotor 3, the rotor blocks 3A, 3B, and 3C and the cooling guides 6 and 7 may be arranged alternately in the axial direction between the pair of end coils 37 and 38.

The rotor 3 may be fixed in position in the axial direction L by the stopper 16 and a retainer 39.

Any one of the pair of end plates 37 and 38 may be caught in the stopper 16 in the axial direction.

The other of the pair of end plates 37 and 38 may be axially caught in the retainer 39 disposed on the outer circumference of the rotary shaft 1.

The rotor 3 may be disposed between the stopper 16 and the retainer 39 in the axial direction, and the stopper 16 and the retainer 39 may fix the axial position of the rotor such that the spray flow paths P1 and P2 formed in the rotor 3 are matched to the spray holes 14 and 15 formed on the rotary shaft 1 in the radial direction R.

Figure 3:
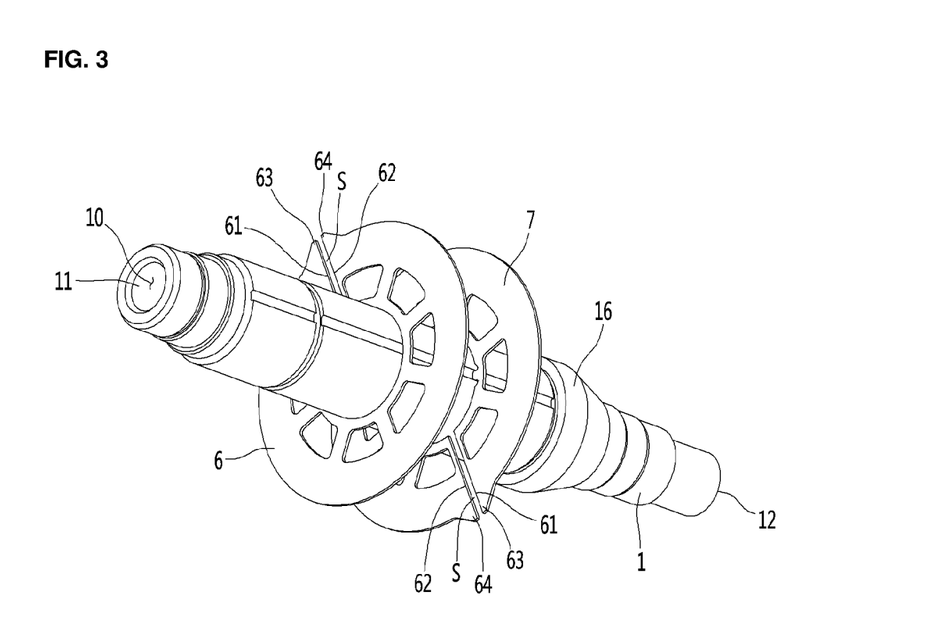
FIG. 3 is a perspective view of a cooling guide installed on a rotary shaft according to an embodiment of the present invention.
Figure 4:
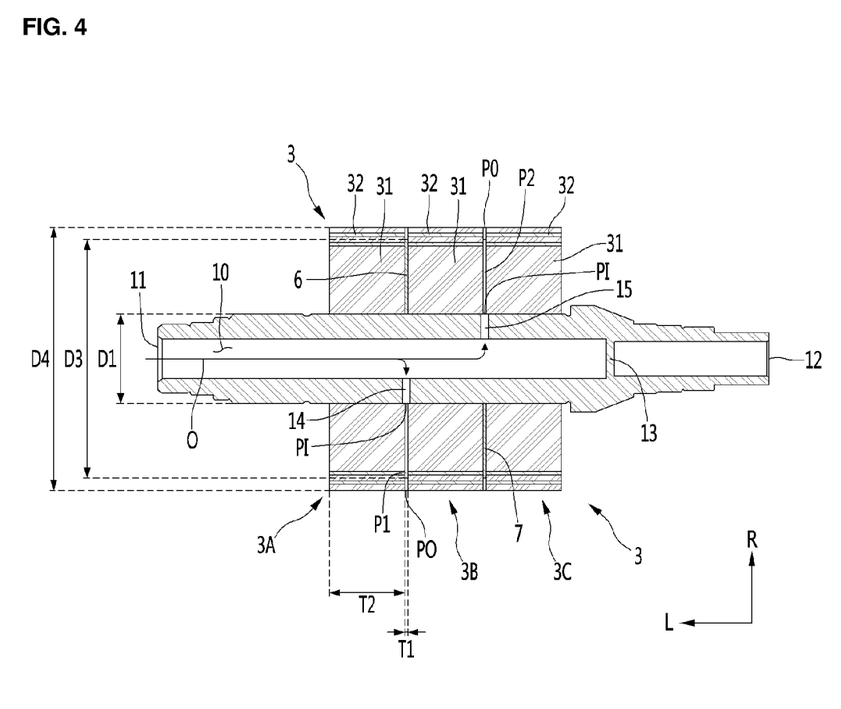
FIG. 4 is a cross-sectional view of a cooling guide installed on a rotary shaft according to an embodiment of the present invention.
Figure 5:
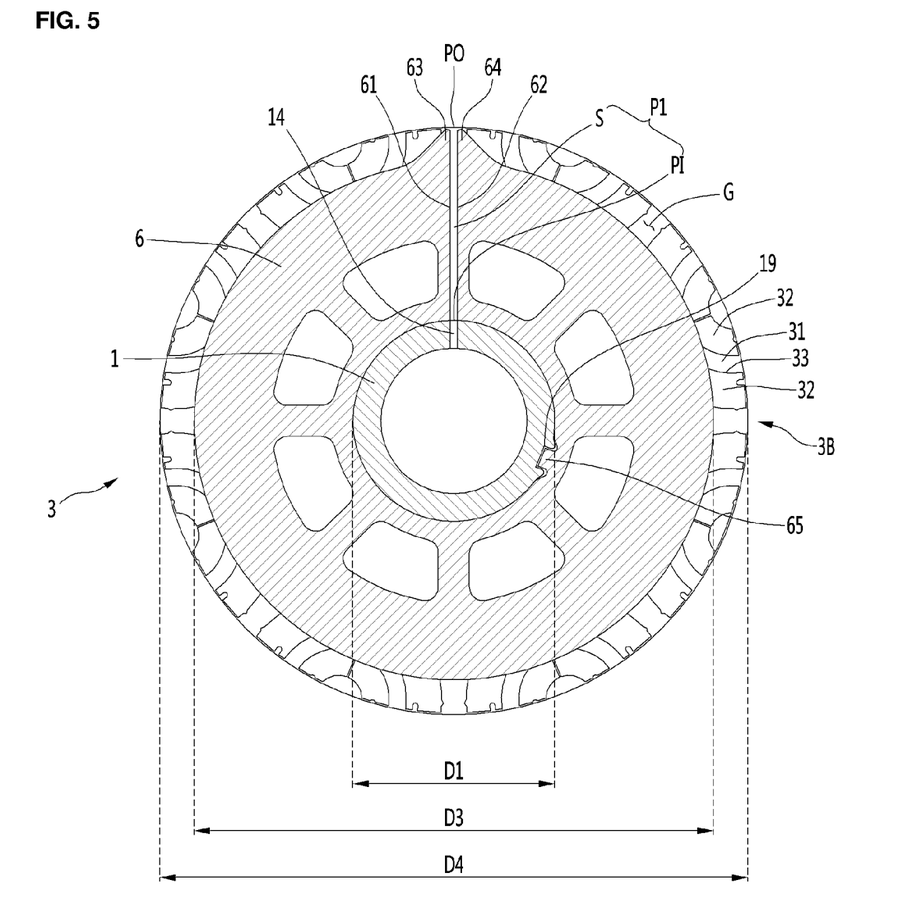
FIG. 5 is a cross-sectional view of a cooling guide according to an embodiment of the present invention.

FIG. 3 is a perspective view of a cooling guide installed on the rotary shaft according to an embodiment of the present invention, FIG. 4 is a cross-sectional view of a cooling guide installed together with a cooling block on an outer circumference of a rotary shaft according to an embodiment of the present invention, and FIG. 5 is a cross-sectional view of a cooling guide according to an embodiment of the present invention.

Hereinafter, a common configuration of a plurality of cooling guides will be described as cooling guides 6 and 7, and when a plurality of cooling guides are distinguished from each other, a first cooling guide 6 and a second cooling guide 7 will be separately described.

A thickness T1 of the cooling guides 6 and 7 may be thinner than a thickness T2 of the rotor core 31.

An inner diameter D1 of the cooling guides 6 and 7 may be equal to an inner diameter of the rotor core 31.

An outer diameter D3 of the cooling guides 6 and 7 may be smaller than or equal to an outer diameter D4 of the rotor core 31.

The outer diameter D3 of the cooling guides 6 and 7 may have such a size that a portion or the entirety of the magnet 32 may face the side surfaces of the cooling guides 6 and 7 in the axial direction L.

One end of the magnet 32 embedded in the rotor core 31 may face the side surfaces of the cooling guides 6 and 7 in the axial direction L and may be in contact with the side surface of the cooling guide 6 in the axial direction L.

In this case, heat of the magnet 32 may be transmitted to the cooling guides 6 and 7 through the side surfaces of the cooling guides 6 and 7 and may be transmitted to the cooling fluid passing through slits S.

The cooling fluid O may be sprayed directly to the inner circumference of the stator 2 to serve to dissipate heat of the stator 2 and also receive heat from the magnet 32 through the cooling guides 6 and 7 to thus dissipate heat of the magnet in a conductive manner.

Meanwhile, when the outer diameter D3 of the cooling guides 6 and 7 is smaller than the outer diameter D4 of the rotor core 31, a gap G having an arc shape in a cross-section thereof, in particular, a major arc shape, may be formed between the pair of adjacent rotor blocks.

A portion of the cooling fluid O sprayed to the inner circumference of the stator 2 from the spray flow paths P1 and P2 of the rotor 3 may fall into the gap G and flow along the gap G, and the cooling fluid O flowing along the gap G may fall after dissipating heat of the rotor core 31 and the magnet 32, while flowing along the side surfaces of the rotor blocks 3A, 3B, and 3C.

The cooling fluid O, while being sprayed through the spray flow paths P1 and P2, may primarily cool the rotor blocks 3A, 3B, and 3C and may be sprayed to the inner circumference of the stator 2 through the spray flow paths P1 and P2 to cool the stator 2, and may fall to the gap G from the inner circumference of the stator 2 to secondarily cool the rotor blocks 3A, 3B, and 3C, while flowing along the gap G.

When cooling is performed by the cooling fluid O as described above, the motor may efficiently dissipate heat of the stator 2 and the rotor 3.

One end 61 and the other end 62 of the cooling guides 6 and 7 may be spaced apart from each other in the circumferential direction. The cooling guides 6 and 7 may have an arc shape overall, and in particular, may have a major arc shape.

The slits S may be formed between the one end 61 and the other end 62 of the cooling guide 6 or 7 to form the spray flow paths P1 or P2. The slits S may be opened in the radial direction R in the cooling guides 6 and 7.

The slits S may be positioned between a pair of adjacent rotor blocks and the spray flow paths P1 and P2 may be formed by a pair of adjacent rotor blocks and one end 61 and the other end 62 of the cooling guides 6 and 7.

An opening direction of the slit S formed in the first cooling guide 6, which is one of the plurality of cooling guides 6 and 7, may be different from an opening direction of the slit S formed in the second cooling guide 7, which is the other of the plurality of cooling guides 6 and 7.

The slit S of the first cooling guide 6 and the slit S of the second cooling guide 7 may be positioned to have a phase difference in the circumferential direction. For example, the slits S of the first and second cooling guides 6 and 7 may be open in a direction in which the first and second cooling guides 6 and 7 have a phase difference of 180° in the circumferential direction.

The cooling guides 6 and 7 may each include a first protrusion 63 and a second protrusion 64.

The first protrusion 63 may protrude in the radial direction from the outer circumference of one end 61 of the cooling guide, and the second protrusion 64 may protrude in the radial direction from the outer circumference of the other end 62 of the cooling guide.

The first protrusion 63 and the second protrusion 64 may be spaced apart from each other in the circumferential direction and each of the first protrusion 63 and the second protrusion 64 may face the inner circumference of the stator 2.

A first fixing portion 65 may protrude from the inner circumference of the cooling guides 6 and 7. The rotary shaft 1 may have a second fixing portion 19 to which the first fixing portion 65 is fixed when the inlet PI of the spray flow path P1 or P2 are matched to the spray holes 14 and 15.

Either of the first fixing portion 65 and the second fixing portion 19 may be a protrusion protruding toward the other, and the other may be a groove into which the protrusion is inserted and fitted.

When the protrusion is inserted into the groove, the first fixing portion 65 may be fitted into the second fixing portion 19 and restrained in the circumferential direction and the slits S of the cooling guides 6 and 7 may be matched to the spray hole 14 or 15 in the radial direction R. Since the protrusion is restrained in the groove, the cooling guides 6 and 7 cannot be arbitrarily rotated in the circumferential direction and the position of the slits may be maintained not to deviate from the spray hole 14 or 15.

That is, the first fixing portion 65 and the second fixing portion 19 may guide and maintain the slits S not to deviate from the spray holes 14 and 15.

Figure 6:
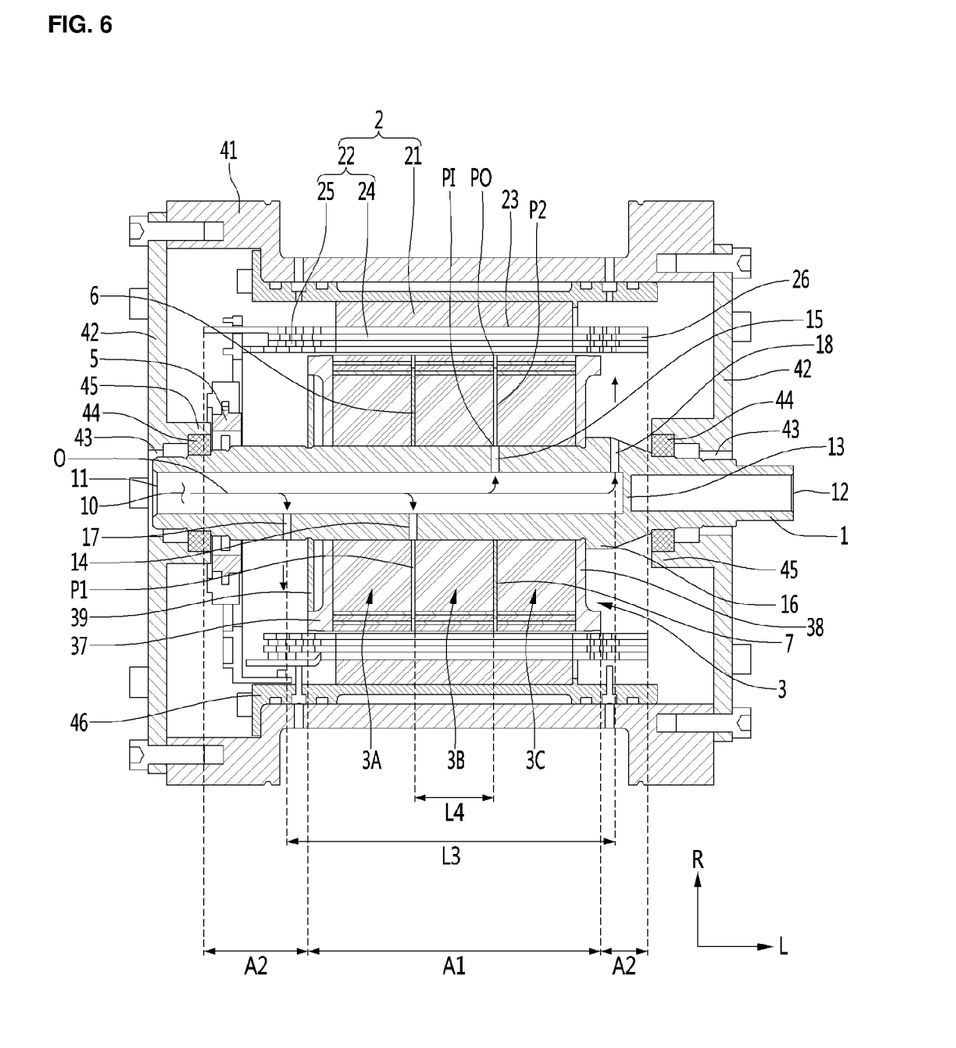
FIG. 6 is a cross-sectional view illustrating a modification of a rotary shaft according to the embodiment of the present invention.

FIG. 6 is a cross-sectional view illustrating a modification of a rotary shaft according to an embodiment of the present invention.

The rotary shaft 1 may have a first region A1 surrounded by the rotor 3 and second regions A2 which are not surrounded by the rotor 3 and in which the end coils 25 and 26 of the coil 22 are oriented in the radial direction R. End coil cooling holes 17 and 18 opened in the radial direction may be formed in the second region A2.

The end coil cooling holes 17 and 18 may be formed as a pair.

A first distance L3 over which the pair of end coil cooling holes 17 and 18 are spaced apart from each other in the axial direction L may be longer than a second distance L4 over which the plurality of spray holes 14 and 15 are spaced apart from each other in the axial direction L.

When the rotary shaft 1 is rotated, the cooling fluid may be distributed into the pair of end coil cooling holes 17 and 18 and the plurality of spray holes 13 and 14, and the cooling fluid sprayed in a centrifugal direction from the pair of end coil cooling holes 17 and 18 may be directly sprayed to the end coils 25 and 26, without passing through the spray flow paths P1 and P2 of the rotor 3.

In the motor, the pair of end coils 25 and 26 may be cooled by the pair of end coil cooling holes 17 and 18 formed on the rotary shaft 1, and the inner coils 24 may be cooled by the spray holes 14 and 15 formed on the rotary shaft 1 and the spray flow paths P1 and P2 formed in the rotor 3.

That is, since the pair of end coils 25 and 26 and the inner coil 24 are cooled independently of each other, the coil may be cooled evenly on as a whole.

The above description is only an example describing a technological scope of the present invention. Various changes, modifications, and replacements may be made by those skilled in the art without departing from the spirit and scope of the present invention.

Therefore, the embodiments disclosed above and in the accompanying drawings should be considered in a descriptive sense only and not for limiting the technological scope. The technological scope of the present invention is not limited by the embodiments and the accompanying drawings.

The spirit and scope of the present invention should be interpreted by the appended claims and encompass all equivalents falling within the scope of the appended claims.

What is claimed is:

1. A motor comprising:
    a rotary shaft having at least one spray hole configured for spraying a cooling fluid from a rotary shaft flow path in the rotary shaft;
    a rotor installed on the rotary shaft; and
    a stator surrounding an outer circumference of the rotor, wherein the rotor comprises:
    a plurality of rotor blocks arranged on an outer circumference of the rotary shaft and each of the rotor blocks including a magnet installed in a rotor core; and
    a cooling guide disposed between two of the plurality of rotor blocks and forming a spray flow path configured to guide the cooling fluid passing through the at least one spray hole to be sprayed to an inner circumference of the stator,
    wherein an outer diameter of the cooling guide is smaller than an outer diameter of the rotor core of each of the rotor blocks,
    wherein a gap is formed between the pair of adjacent rotor blocks and the gap has a major arc shape, and
    wherein a portion of the cooling fluid sprayed to the inner circumference of the stator from the spray flow path falls into the gap and flows along the gap.

2. The motor of claim 1, wherein
    the stator comprises:
    a stator core having a slot; and
    a coil wound around the slot,
    wherein an outlet of the spray flow path is opened toward the inner circumference of the stator core.

3. The motor of claim 1, wherein
    an inlet of the spray flow path is aligned with the spray hole in a radial direction.

4. The motor of claim 3, wherein
    the cooling guide includes a first fixing portion protruding from an inner circumference of the cooling guide, and
    the rotary shaft includes a second fixing portion fixed with the first fixing portion when the inlet of the spray flow path is positioned to be aligned with the spray hole.

5. The motor of claim 1, wherein
    the rotary shaft includes a plurality of spray holes provided at axially spaced positions along the rotary shaft.

6. The motor of claim 5, further comprising:
    a sensor configured to sense a rotation speed of the rotary shaft,
    wherein any one of the plurality of spray holes is closer to the sensor than any others of the plurality of spray holes.

7. The motor of claim 1, wherein
    the stator comprises a coil; and
    wherein the rotary shaft further includes:
    a first region surrounded by the rotor; and
    a second region not surrounded by the rotor and facing an end coil of the coil.

8. The motor of claim 1, wherein
    the plurality of rotor blocks are spaced apart from each other in an axial direction, and
    the cooling guide is disposed between a pair of rotor blocks adjacent to each other in the axial direction of the rotary shaft.

9. The motor of claim 1, wherein
    a thickness of the cooling guide is smaller than a thickness of the rotor core of each of the rotor blocks.

10. The motor of claim 9, wherein
    an inner diameter of the cooling guide is equal to an inner diameter of each of the rotor blocks.

11. The motor of claim 1, wherein
    the rotor core of each of the rotor blocks is a conductor, and
    the cooling guide is a non-conductor.

12. The motor of claim 1, wherein
    the cooling guide comprises aluminum or a synthetic resin.

13. The motor of claim 1, wherein
    a first circumferential end and a second circumferential end of the cooling guide are spaced apart from each other in a circumferential direction, and
    a slit forming the spray flow path is formed between the first and second circumferential ends of the cooling guide.

14. The motor of claim 13, wherein
    the slit is opened in a radial direction on the cooling guide.

15. The motor of claim 13, wherein
    the cooling guide is one of a plurality of cooling guides disposed on an outer circumference of the rotary shaft,
    the plurality of cooling guides being spaced apart from each other in an axial direction of the rotary shaft, and
    an opening direction of a slit formed on any one of the plurality of cooling guides being different from an opening direction of a slit formed on any other of the plurality of cooling guides.

16. The motor of claim 13, further comprising:
    a first protrusion protruding from an outer circumference of the first circumferential end of the cooling guide in a radial direction; and
    a second protrusion protruding from an outer circumference of the second circumferential end of the cooling guide in the radial direction,
    wherein the first protrusion and the second protrusion are spaced apart from each other in a circumferential direction, and
    the first protrusion and the second protrusion each face the inner circumference of the stator.

17. The motor of claim 1, wherein
    the rotary shaft further includes:
    a first region surrounded by the rotor; and
    a second region not surrounded by the rotor and facing an end coil of a coil of the stator,
    wherein the second region has an end coil cooling hole opened in a radial direction.

18. The motor of claim 17, wherein
    the rotary shaft includes a pair of end coil cooling holes,
    the stator includes a pair of end coils, and
    the pair of end coils are spaced apart from each other in an axial direction by a first distance that is greater than a second distance over which a plurality of the at least one spray holes are spaced apart from each other in the axial direction.

19. The motor of claim 17, wherein the rotor includes a pair of end plates each covering an axially outermost rotor block, the rotary shaft includes a stopper protruding from an outer circumference of the rotary shaft, the stopper being configured to act as an axial stop for any one of the pair of end plates, and a retainer is disposed on the outer circumference of the rotary shaft, the retainer being configured to act as an axial stop for the other of the pair of end plates.

* * * * *